Dec. 28, 1937.　　　　　R. S. HINSEY　　　　　2,103,850
APPARATUS FOR SUPPORTING GLASS SHEETS
Filed Dec. 26, 1935　　　　2 Sheets—Sheet 1
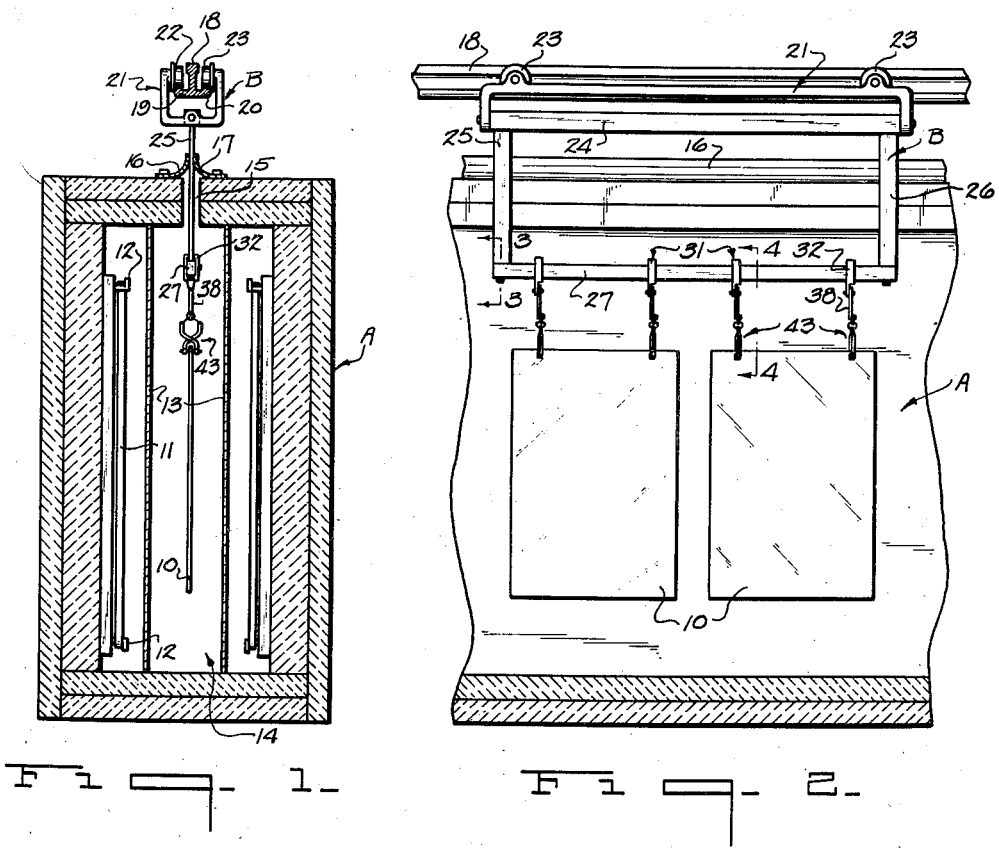
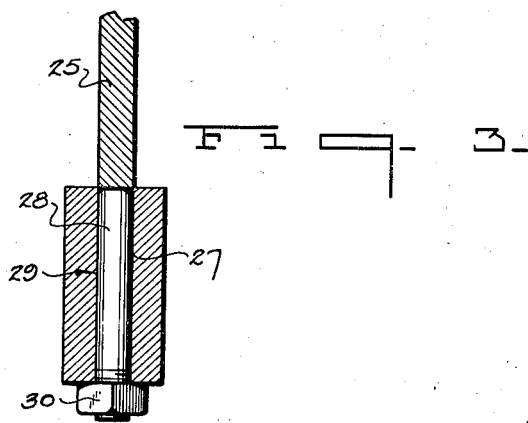
Inventor
ROBERT S. HINSEY.
By Frank Fraser
Attorney

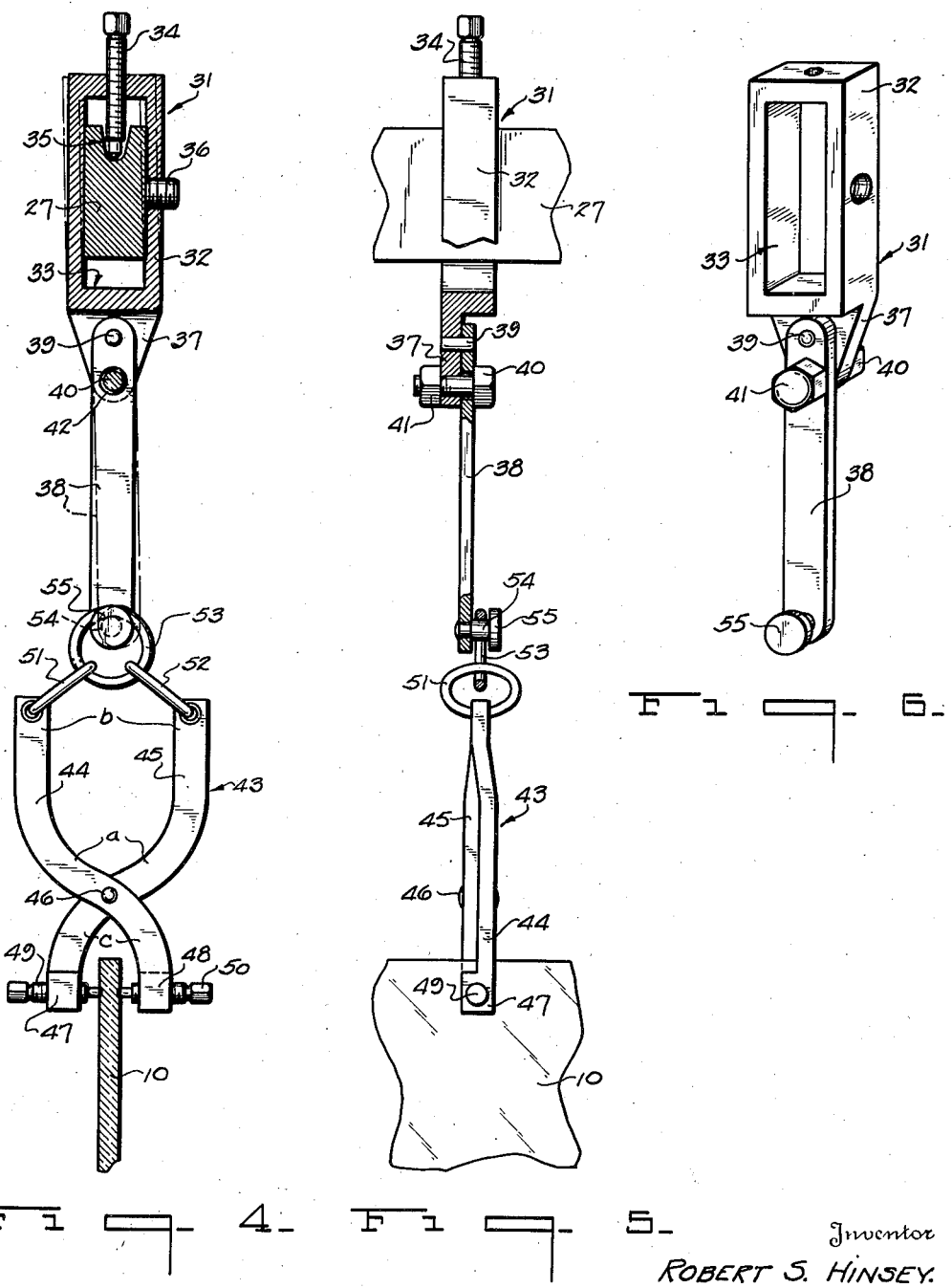

Patented Dec. 28, 1937

2,103,850

UNITED STATES PATENT OFFICE 2,103,850

APPARATUS FOR SUPPORTING GLASS SHEETS

Robert S. Hinsey, Toledo, Ohio, assignor to Libby-Owens-Ford Glass Company, Toledo, Ohio, a corporation of Ohio Application December 26, 1935, Serial No. 56,179

7 Claims. (Cl. 49—14)

The present invention relates to an apparatus for use in the tempering of glass sheets and more particularly to the means employed for supporting the said sheets during the treatment thereof.

In the tempering of glass sheets, according to one known process, the sheets are first heated to approximately the point of softening of the glass and then suddenly chilled to place the outer surfaces of the said sheets under compression and the interiors thereof under tension. The treatment of glass in this manner not only materially increases the mechanical strength thereof, but further modifies its breaking characteristics in that, when broken, the glass sheet will disintegrate into innumerable small and relatively harmless particles instead of breaking into large dangerous pieces or slivers as is the case with ordinary glass sheets.

Due to the fact that the glass sheets must be heated to approximately the point of softening of the glass, it will be appreciated that great care must be exercised in the proper supporting and handling of the sheets to prevent buckling or warping thereof as well as to permit substantially uniform treatment of the sheet throughout its entire area. And this is especially true since glass sheets, thus tempered, cannot be subsequently ground and polished or cut without causing the complete shattering thereof. It is customary to maintain the glass sheets in a vertical position during the treatment thereof by suspending them from a plurality of relatively small tongs or hooks which engage opposite faces of said sheets near their upper edges.

This invention has for its primary object the provision of novel and improved means for supporting the hooks or tongs which engage and carry the glass sheets during tempering and embraces, among other features, means for raising and lowering the tongs independently of one another to facilitate proper positioning and hanging of the glass sheets together with means for bringing the tongs into alignment with one another should they be thrown out of alignment by twisting of the tong supporting means whereby to reduce to a minimum the liability of distortion or warpage of the sheet upon heating thereof.

Other objects and advantages of the invention will become more apparent during the course of the following description when taken in connection with the accompanying drawings.

In the drawings wherein like numerals are employed to designate like parts throughout the same, Fig. 1 is a vertical transverse sectional view through a heating furnace showing the improved sheet supporting means provided by the present invention associated therewith;

Fig. 2 is a vertical longitudinal sectional view through the furnace showing the sheet supporting means in side elevation;

Fig. 3 is a detail sectional view taken substantially on line 3—3 of Fig. 2;

Fig. 4 is a sectional view taken substantially on line 4—4 of Fig. 2 showing one of the tongs and the supporting means therefor;

Fig. 5 is a view taken at substantially right angles to Fig. 4, partially in section; and Fig. 6 is a perspective view of one of the tong supporting units.

As brought out above, in the production of tempered glass, the sheets, while suspended in a vertical position from tongs or hooks engaging the same near their upper edges, are first heated to approximately the point of softening of the glass, which ordinarily is in the neighborhood of 1250° F. for the usual types of flat glass, after which the sheets are suddenly chilled by directing blasts or jets of air upon opposite surfaces of the heated glass to place the said surfaces under compression and the interiors of the sheets under tension. It is customary to first place the glass in a furnace for the heating operation and to then withdraw the glass from the furnace and position it between suitable cooling devices. In the event the glass sheet is not properly hung from the supporting hooks or tongs, it is very apt to become warped or distorted during the heating thereof, and it is an aim of this invention to provide novel means for supporting the sheets in such a manner that warpage or distortion of the glass will be reduced to a minimum.

With reference to the drawings, the letter A designates in its entirety one type of furnace which may be used for heating the glass sheets to the desired temperature, while the letter B designates generally the improved means herein provided for supporting the glass sheets 10 to be tempered within said furnace.

Although the particular construction of the furnace A constitutes no part of the present invention per se, the furnace disclosed is of the electrically heated type and is provided with electrical heating elements 11 carried by insulators 12 and which are adapted to be connected to any suitable controlling and indicating devices so that the temperature of the furnace can be accurately regulated. Baffle walls 13 may also be used and it will be seen that they cooperate with the top and bottom walls of the furnace to form a compartment 14 within which the glass sheets 10 are received. The top wall of the furnace is provided with a longitudinally extending slot 15 normally closed by a pair of flexible closure members 16 and 17 which may consist of strips of asbestos.

The glass sheet supporting means B is mounted for movement along a mono-rail 18 extending longitudinally above the furnace A and being provided with the oppositely directed horizontal flanges 19 and 20. More specifically, the supporting means comprises a carriage 21 provided adjacent each end thereof with a pair of wheels 22 and 23 which roll along upon the flanges 19 and 20 respectively of the rail 18. Extending between and carried by the opposite ends of the carriage is a horizontal supporting member 24 and secured to and depending from opposite ends of said member are vertical bars 25 and 26 respectively, to the lower ends of which is secured the horizontal tong supporting bar 27. As shown in Fig. 3, the lower ends of the vertical bars 25 and 26 are preferably made cylindrical as at 28 and the horizontal supporting bar 27 is provided with openings 29 through which the cylindrical portions extend and upon the lower ends of which are threaded nuts 30.

Carried by the supporting bar 27 are a plurality of tong supporting units 31, each comprising a substantially rectangular yoke 32 encircling said bar and having an opening 33 through which the bar is received. The width of the opening 33 in the yoke is substantially the same as the thickness of the bar 27 while the height of said opening is somewhat greater than the width of said bar, thereby permitting the yoke to be moved vertically relative thereto. This vertical adjustment is effected by a screw 34 threaded through the top of the yoke and received within a longitudinally extending, substantially V-shaped groove 35 formed in the upper surface of the tong support bar 27. The yoke may be slid longitudinally along the tong support bar to the desired position and secured in such position by a set screw 36.

The yoke 32 is provided with a depending ear 37 which carries a depending hanger element 38 in the form of a substantially flat metal strap pivoted at its upper end to the ear 37 as at 39 and being secured against pivotal movement by a bolt 40 and nut 41. The opening 42 in the strap 38 through which bolt 40 passes is relatively larger than the said bolt so that the said strap will be permitted a limited amount of swinging movement about its pivotal point 39 when the nut 41 is loosened.

Carried at the lower end of the strap 38 is the tong which is designated in its entirety by the numeral 43. The tong comprises a pair of substantially vertical or upstanding complemental tong members or levers 44 and 45 pivotally connected in overlapping relation intermediate their ends as at 46. The tong members 44 and 45 are bent as at $a$ and cross one another at substantially right angles so that the opposite ends thereof may be swung simultaneously toward and away from one another. The upper ends $b$ of the tong members constitute handle portions, while the lower ends $c$ thereof constitute jaw portions.

The jaw portions $c$ of tong members 44 and 45 are formed at their lower ends with thickened parts 47 and 48 respectively which carry the work gripping elements 49 and 50 comprising screws threaded horizontally through the said thickened parts and having smooth rounded inner ends which engage opposite faces of the glass sheet 10.

Carried at the upper ends of handle portions $b$ of tong members 44 and 45 are rings 51 and 52 respectively through which is looped a third ring 53 which is hung from a horizontal pin 54 carried at the lower end of the strap 38 and which pin is provided with a head 55 to prevent accidental displacement of said ring. The rings 51 and 52 constitute, in effect, toggle links which are responsive to upward movement of the ring 53 relative to the tong members to swing the handle portions $b$ together to close the jaw portions $c$.

In practice, one or a plurality of glass sheets 10 are first hung from the tongs 43 which engage the said sheets near their upper edges, after which the carriage 21 is rolled along the rail 18 to move the said sheets into the furnace A where they are heated to bring them to a temperature corresponding approximately to the point of softening of the glass. After the sheets have been properly heated, the carriage 21 is again moved along the rail 18 to withdraw the said sheets from the furnace and bring them into proper relation with respect to the cooling means. The cooling means has not been illustrated as it constitutes no part of the present invention, it being sufficient to state that any type of cooling means capable of rapidly acting upon the glass in a manner to place the outer surfaces of the sheets under compression and the interiors thereof under tension may be used. After being cooled, the sheets are detached from the tongs 43 and are ready for use. When the glass sheets are moved into the furnace, the vertical bars 25 and 26 of the supporting means project through the slot 15 in the top wall of said furnace, and since the closure members 16 and 17 are flexible, they in no way interfere with the movement of the carriage 21 along rail 18.

With the above type of tong supporting means, it will be readily apparent that the several tongs 43 can be adjusted vertically independently of one another and relative to the supporting bar 27 by simply loosening the set screws 36 and properly adjusting screws 34. Further, that the tongs can also be moved longitudinally along the bar 27 to take care of different sized sheets.

Another important advantage of this type of tong support is that it embodies means for bringing the tongs back into alignment with one another should they be thrown out of alignment by twisting of the tong supporting bar 27. Thus, should any twist occur in the bar 27 during the heating of the glass sheets, such twist would naturally be imparted to the tong supporting unit and cause the strap 38 thereof to be swung to one side to an inclined position as indicated by the broken lines in Fig. 4. This would of course result in the tong 43 carried thereby being thrown out of alignment with the other tongs and were this condition not corrected, it will be apparent that the glass sheet, upon being heated to its point of softening, would be very apt to become warped or distorted. With the present invention, however, should this condition occur, it is simply necessary, in order to again bring the tong into alignment with the other tongs, to first loosen the nut 41, swing the strap 38 in the desired direction about its pivotal point 39, until the tong carried thereby is brought back into alignment with the other tongs, after which the nut 41 is tightened to maintain the said tong in such position. By the provision of means for aligning the tongs to overcome any twist which might occur in the yoke support bar 27, warpage and distortion of the sheet upon heating thereof is reduced to a minimum. The tongs 43 are of course swingably carried by the pins 54 and are therefore permitted to always hang freely in a vertical position.

It is to be understood that the form of the invention herewith shown and described is to be taken as the preferred embodiment of the same, and that various changes in the shape, size and arrangement of parts may be resorted to without departing from the spirit of the invention or the scope of the subjoined claims.

I claim:

1. Apparatus for use in the tempering of glass sheets, comprising movable supporting means including a horizontal supporting bar, a tong supporting unit secured to said bar and including a pivotally mounted hanger element, means for securing the hanger element against pivotal movement, and a tong carried by said hanger element and having work gripping portions adapted to engage the glass sheet.

2. Apparatus for use in the tempering of glass sheets, comprising movable supporting means including a horizontal supporting bar, a tong supporting unit slidably mounted upon said bar and including a pivotally mounted hanger element, means for securing the unit to the bar, means for securing the hanger element against pivotal movement, and a tong carried by said hanger element and having work gripping portions adapted to engage the glass sheet.

3. Apparatus for use in the tempering of glass sheets, comprising movable supporting means including a horizontal supporting bar, a tong supporting unit secured to said bar and including a yoke, a strap depending from said yoke and pivotally connected thereto adjacent its upper end, a tong carried at the lower end of said strap and having work gripping portions adapted to engage the glass sheet, and means for securing the strap against pivotal movement.

4. Apparatus for use in the tempering of glass sheets, comprising movable supporting means including a horizontal supporting bar, a tong supporting unit including a yoke encircling said bar and having an opening for receiving the bar therethrough, means for securing the yoke to said bar, a strap depending from the yoke and pivotally connected thereto adjacent its upper end, means for securing the strap against pivotal movement, and a tong swingably carried at the lower end of said strap and having work gripping portions adapted to engage the glass sheet.

5. Apparatus for use in the tempering of glass sheets, comprising movable supporting means including a horizontal supporting bar, a tong supporting unit secured to said bar and including a pivotally mounted hanger element, means for securing the hanger element against pivotal movement, a tong carried by said hanger element and having work gripping portions adapted to engage the glass sheet, and means for moving the tong supporting unit vertically relative to the supporting bar to effect raising and lowering of the tong.

6. Apparatus for use in the tempering of glass sheets, comprising movable supporting means including a horizontal supporting bar, a tong supporting unit including a yoke slidably mounted upon said bar, means for securing the yoke to the bar, a strap depending from the yoke and pivotally connected thereto adjacent its upper end, means for securing the strap against pivotal movement, a tong carried at the lower end of said strap and having work gripping portions adapted to engage the glass sheet, and means for moving the yoke vertically relative to said supporting bar to effect raising or lowering of said tong.

7. Apparatus for use in the tempering of glass sheets, comprising movable supporting means including a horizontal supporting bar, a tong supporting unit including a yoke slidably mounted upon said bar, means for securing the yoke to said bar, a strap depending from the yoke and pivotally connected thereto adjacent its upper end, means for securing the strap against pivotal movement, a tong swingably carried at the lower end of said strap and having work gripping portions adapted to engage the glass sheet, and means carried by said yoke and engaging said supporting bar for moving the former vertically relative to the latter to effect raising or lowering of said tong.

ROBERT S. HINSEY.